United States Patent
Lauwers

(10) Patent No.: US 11,993,139 B2
(45) Date of Patent: May 28, 2024

(54) COMPACT DRIVE FOR A VEHICLE

(71) Applicant: SMESH BV, Netersel (NL)

(72) Inventor: Leonardus Gijsbertus Cornelis Lauwers, Netersel (NL)

( * ) Notice: Subject to any disclaimer, the term of this patent is extended or adjusted under 35 U.S.C. 154(b) by 0 days.

(21) Appl. No.: 18/251,472

(22) PCT Filed: Nov. 2, 2021

(86) PCT No.: PCT/NL2021/050670
§ 371 (c)(1),
(2) Date: May 2, 2023

(87) PCT Pub. No.: WO2022/093031
PCT Pub. Date: May 5, 2022

(65) Prior Publication Data

US 2024/0001750 A1    Jan. 4, 2024

(30) Foreign Application Priority Data

Nov. 2, 2020 (WO) ................ PCT/NL2020/050680

(51) Int. Cl.
*B60K 17/16* (2006.01)
*B60K 1/02* (2006.01)
(Continued)

(52) U.S. Cl.
CPC ................ *B60K 1/02* (2013.01); *B60K 17/02* (2013.01); *B60K 17/08* (2013.01); *B60K 17/16* (2013.01)

(58) Field of Classification Search
CPC ......... B60K 17/02; B60K 17/16; F16H 48/06; F16H 48/22; F16H 2048/343
See application file for complete search history.

(56) References Cited

U.S. PATENT DOCUMENTS

2006/0293141 A1* 12/2006 Sharma ................... F16H 48/08
                                                                475/204
2018/0304744 A1   10/2018 Wang et al.
2019/0291563 A1*  9/2019 Ogino ..................... B60K 6/365

FOREIGN PATENT DOCUMENTS

CN          203567552 U  *  4/2014
DE       102014015793 A1     4/2016
(Continued)

OTHER PUBLICATIONS

ISR: European Patent Office: NL; Apr. 12, 2022.

*Primary Examiner* — Edwin A Young
(74) *Attorney, Agent, or Firm* — Patshegen IP; Moshe Pinchas

(57) ABSTRACT

A compact drive 1 has a housing 3 with two electric motors 5 and 31 therein and a transmission 9 provided with a differential 9 via which the electric motors are connected to output shafts 13. The transmission 9 further has a first switchable planetary gear set 17, which is present between the differential and the electric motors, and two second switchable planetary gear sets 23 located between the differential and the output shafts. One rotation body of these gear sets can be connected via a brake to the housing 3 and via a coupling to another of the rotation bodies. The brake and the clutch can only be operated simultaneously in such a way that when the brake is energized, the clutch is opened and vice versa. The output shafts, the electric motors and the transmission are concentric and the housing is cylindrical for a compact and robust construction.

12 Claims, 2 Drawing Sheets

(51) Int. Cl.
*B60K 17/02* (2006.01)
*B60K 17/08* (2006.01)

(56) References Cited

FOREIGN PATENT DOCUMENTS

| | | |
|---|---|---|
| DE | 102017111051 B3 | 6/2018 |
| DE | 102017006266 A1 | 1/2019 |
| DE | 102017011401 A1 | 6/2019 |

* cited by examiner

COMPACT DRIVE FOR A VEHICLE

TECHNICAL FIELD OF THE INVENTION

The invention relates to a compact drive for a vehicle, comprising:
- a frame,
- at least one motor with a house attached to the frame and a drive shaft,
- a transmission with an input shaft that is connected to the house of the motor and two output shafts that are in one line and are mounted in the frame, which transmission:
  - comprises a differential, with an input connected to the rotor of the motor and two outputs connected to the output shafts, and
  - a first switchable planetary gear set with three rotation bodies, and
  - wherein of the three rotation bodies of the first switchable planetary gear set, a rotation body is connected to the rotor of the motor.

A frame can also be understood as a housing or a part of a vehicle for example a chassis.

BACKGROUND OF THE INVENTION

Such a drive is known from DE 10 2017 011 401 A1. The known drive requires relatively much installation space.

SUMMARY OF THE INVENTION

An object of the invention is to provide a drive of the type described in the preamble which is compact and robust and with which large transmission ratios can be realized. To this end, the drive according to the invention is characterized in that:
- of the three rotation bodies of the first switchable planetary gear set, a first rotation body is connected to the input of the differential, said rotation body, which is connected to the rotor of the motor, forms the second rotation body, and a third rotation body can be connected to the frame via a first brake, wherein the first and third rotation body can be connected to each other by a first clutch, and wherein the first brake and the first clutch are operated simultaneously such that when the first brake is activated, the first clutch is opened and vice versa, and
- the output shafts and the drive shaft of the motor being concentric.

By making use of a switchable planetary gear set in the way described above a compact drive can be realized. A brake can here also be understood to mean a coupling that couples the relevant rotation body to the frame (fixed world).

Preferably, one of the outputs of the differential passes through the motor which has a hollow drive shaft for this purpose. This results in an even more compact drive.

Preferably, the output shafts, the drive shaft electric of the motor and the transmission being concentric. Because the components of the drive are in one line and are concentric, a compact drive can be realized.

To further compact the drive an embodiment of the drive according to the invention is characterized in that the transmission further comprises two second switchable planetary gear sets, each with three rotation bodies, of the three rotation bodies of each of the second switchable planetary gear sets, a first rotation body is connected to one of the outputs of the differential, a second rotation body is connected to one of the output shafts, and a third rotation body can be connected to the frame via a second brake, wherein the second and third rotation body can be connected to each other by a second coupling, and wherein the second brake and the second clutch are operated simultaneously such that when the second brake is energized, the second clutch is opened and vice versa.

The transmission is preferably further provided with two final transmissions, each comprising at least one planetary gear set, each planetary gear set has three rotation bodies of which a first rotation body is connected to the second rotation body of one of the second switchable planetary gear units, a second rotation body is connected to one of the output shafts, and a third rotation body is attached to the frame.

A further embodiment of the compact drive according to the invention is characterized in that the drive comprises a further motor provided with a house which is attached to the frame and a drive shaft which can be connected via a third coupling to the drive shaft of the motor, both of which motors are concentric.

Another embodiment of the compact drive according to the invention is characterized in that the drive comprises a further motor provided with a house attached to the frame and a drive shaft that can be connected via a third coupling to a third switchable planetary gear set with three rotation bodies. of which a first rotation body is connected to the input of the differential, a second rotation body is connected to the dive shaft of the motor, and a third rotation body can be connected to the frame via a third brake, whereby the first and third rotation body can be connected to each other are operated by a third clutch, in which the two motors are concentric, and in which the third brake and the third clutch are operated simultaneously such that when the third brake is activated, the third clutch is opened and vice versa.

Preferably, in the embodiment described above, the first rotation body of the first switchable planetary gear set and the first rotation body of the third switchable planetary gear set are attached to each other.

Preferably, the motor and/or the further motor is an electric motor having a rotor and a stator, wherein the drive shaft being part of the rotor and the house being part of the stator.

A further embodiment of the compact drive according to the invention is characterized in that the frame is designed like a housing having a cylindrical shape and being closed at both ends by radially extending walls provided with central openings through which the output shafts protrude. This is a compact and robust embodiment of the drive.

The invention also relates to a vehicle provided with a compact drive according to the invention, which vehicle comprises two driven wheels with two wheel shafts attached thereto which are connected to the output shafts, the housing extending longitudinally between the wheels.

An embodiment of the vehicle according to the invention is characterized in that the wheel shafts are aligned with and attached to the output shafts. As a result, the drive is part of the unsprung mass (only sprung from the road by the tires of the wheels).

A further embodiment of the vehicle according to the invention is characterized in that the wheels are provided with rims and the outer diameter of the housing is smaller than the outer diameter of the rims. The construction of the drive according to the invention makes such a compact design possible.

BRIEF DESCRIPTION OF THE DRAWINGS

The invention will be explained in more detail below with reference to exemplary embodiments of the vehicle provided with the drive according to the invention shown in the drawings. Herein is.

DETAILED DESCRIPTION OF THE DRAWINGS

Figure 1:
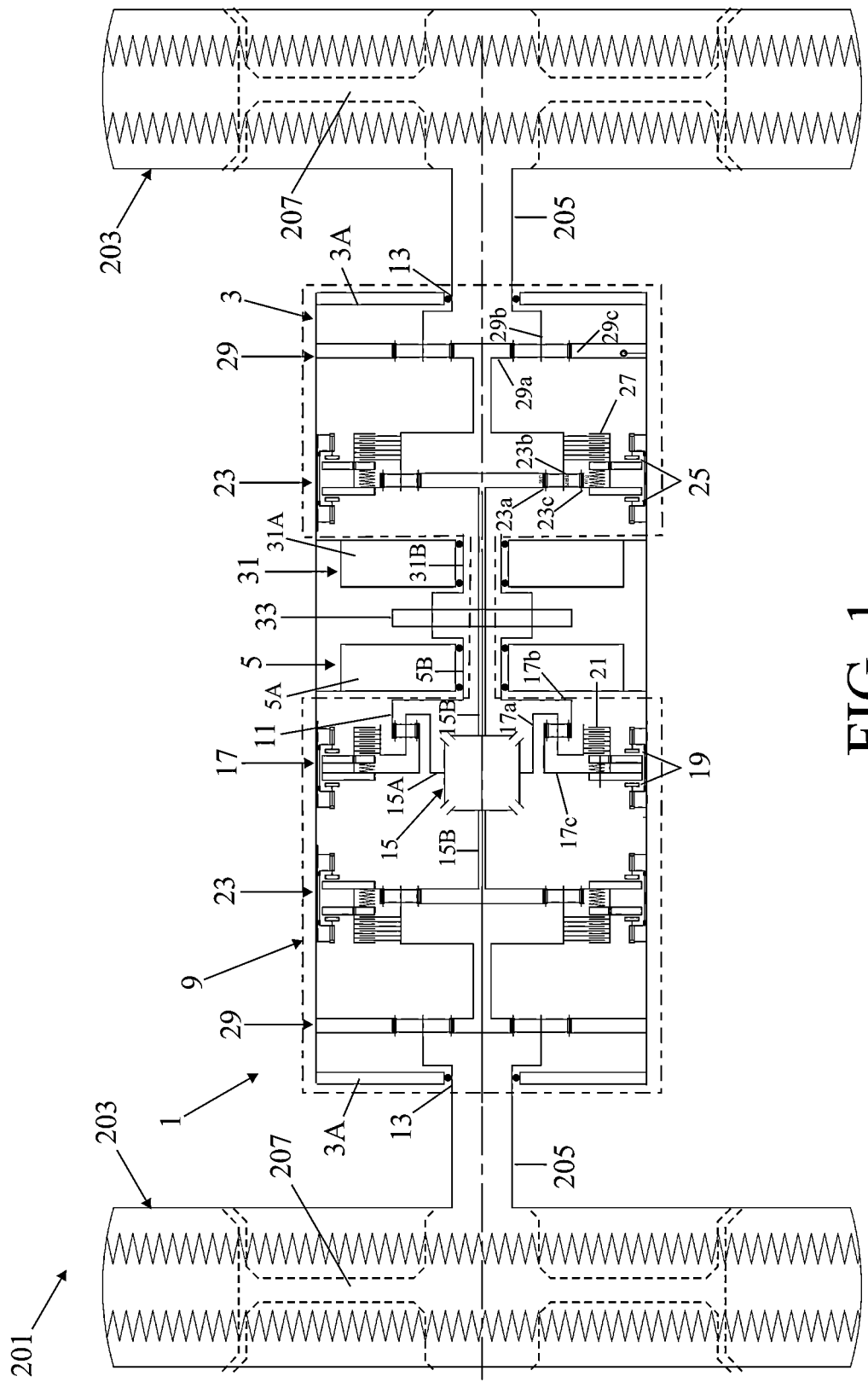
FIG. 1 a schematic representation of part of a first embodiment of the vehicle according to the invention.

FIG. 1 shows schematically a part of a first embodiment of the vehicle according to the invention. The vehicle 201 is provided with a compact drive designed like an electric drive 1 via which two wheels 203 are driven. Attached to the wheels are wheel axles 205 which are connected via a transmission 9 to two electric motors 5 and 31. The transmission 3 has a frame designed like a housing 3 in which the electric motors are present and from which two output shafts 13 protrude that are mounted in end walls 3A of the housing and to which the wheel axles 205 are attached. The wheel shafts 205 are in alignment with the output shafts 13. The housing 3 extends longitudinally between the wheels 203 and has a cylindrical shape with an outer diameter smaller than that of rims 207 of the wheels 203.

The electric motors 5 and 31 are attached to the housing 3 with the stator 5A and the rotor 5B connected to the input shaft 11 of the transmission 9. The transmission further has a differential 15, with an input 15A, which is connected to the rotor 5B of the electric motor 5, and two outputs 15B which are connected via further transmissions to the output shafts 13. The transmission further has a first switchable planetary gear set 17 with three rotation bodies. Of these rotation bodies, a first rotation body 17a is connected to the input 15A of the differential, a second rotation body 17b is connected to the rotor 5B of the electric motor, and a third rotation body 17c can be connected to the housing 3 via a first brake 19. The first and third rotation bodies 17a and 17c can be connected to each other by a first clutch 21. The first brake 19 and the first clutch 21 are coupled to each other so that they can only be operated simultaneously, wherein when the first brake 19 is energized, the first clutch 21 is opened and vice versa.

The transmission 9 further has at least two second switchable planetary gear sets 23, which also each have three rotational bodies. Of these rotation bodies, a first rotation body 23a is connected to one of the outputs 15B of the differential, a second rotation body 23b is connected to one of the output shafts 13, and a third rotation body 23c can be connected to the housing 3 via a second brake. The second and third rotation body 23b and 23c can also be connected to each other by means of a second coupling 27, whereby the second brake 25 and the second coupling 27 can again only be operated simultaneously, wherein if the second brake 25 is energized, the second link 27 is opened and vice versa.

The outputs 15B of the differential pass through the electric motors 5 and 31, which have a hollow rotor 15B for this purpose, so that the output shafts 13, the electric motors 5 and 31 and the transmission 9 are concentric.

Between each second switchable planetary gear set 23 and the associated output shaft 23 there is at least one final transmission formed by a planetary gear set 29 with three rotation bodies, of which a first rotation body 29a is connected to the second rotation body 23b of the second switchable planetary gear assembly 23, a second rotation body 29b is connected to the output shaft 13, and a third rotation body 29c is attached to the housing 3.

The rotor 31B of the electric motor 31 is connected via a coupling 33 to the rotor 5B of the electric motor 5, so that if only little power is required, the vehicle can be driven with only one electric motor.

Figure 2:
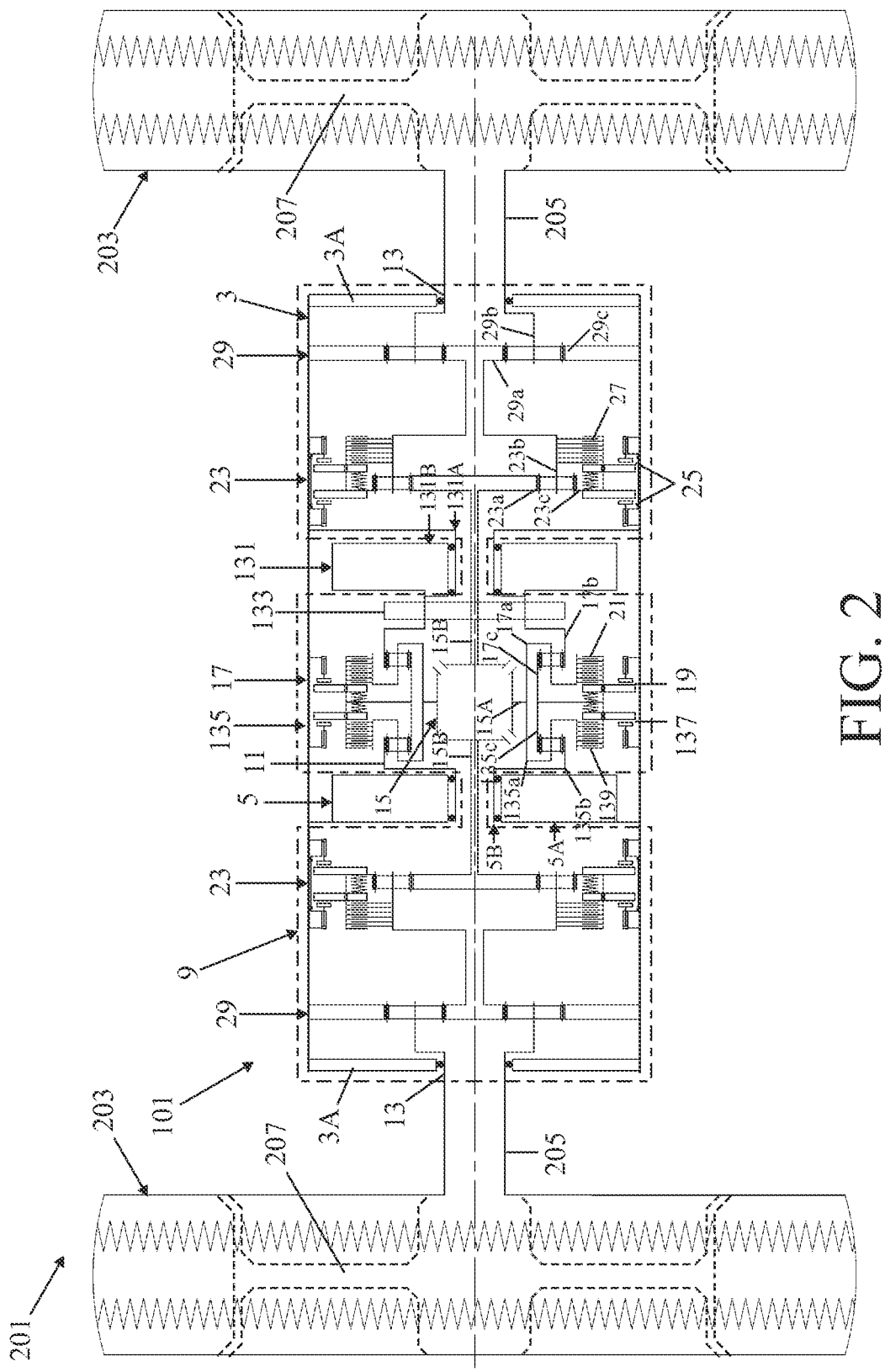
FIG. 2 a schematic representation of part of a second embodiment of the vehicle according to the invention.

FIG. 2 shows schematically a part of a second embodiment of the vehicle according to the invention. All parts identical to those of the above-described first embodiment are designated with the same reference numerals. In this embodiment each electric motor 5 and 131 is located on one side of the differential 15 so that a completely symmetrical construction is obtained. In this case too, the stator 131A of the electric motor is attached to the housing 13. The rotor 131B of the electric motor 131 can be connected via a third coupling 133 to a third switchable planetary gear set 135 with three rotation bodies. A first rotation body 135a is connected to the differential input 15A and a second rotation body 135b is connected to the rotor 131B of the electric motor. A third rotation body 135c can be connected to the housing 3 via a third brake 137 and the first and third rotation bodies 135a and 135c can be connected to each other by a third coupling 139.

The two electric motors 5 and 131 are also concentric here. The third brake 137 and the third clutch 139 can again only be operated simultaneously, such that when the third brake 137 is energized, the third clutch 139 is opened and vice versa. The first rotation body 17a of the first switchable planetary gear set 17 and the first rotation body 135a of the third switchable planetary gear set 135 are herein attached to each other.

In the two embodiments described above, the electric drive 1 thus has a housing 3 containing two electric motors 5 and 31 and a transmission 9 provided with a differential 9 via which the electric motors are connected to output shafts 13. In both embodiments, the transmission 9 has a first switchable planetary gear set 17 located between the differential and the electric motors, and two second switchable planetary gear sets 23 located between the differential and the output shafts. One rotation body of these switchable planetary gear sets can be connected to the housing 3 via a brake and can be connected to another of the rotation bodies via a coupling. The brake and the clutch can only be operated simultaneously in such a way that when the brake is energized, the clutch is opened and vice versa. In both embodiments, the output shafts, the electric motors and the transmission are concentric and the housing is cylindrical, so that a compact and robust construction is obtained.

Although the present invention is elucidated above on the basis of the given drawings, it should be noted that this invention is not limited whatsoever to the embodiments shown in the drawings. The invention also extends to all embodiments deviating from the embodiments shown in the drawings within the scope of the invention defined by the appended claims.

The invention claimed is:

1. A compact drive (1; 101) for a vehicle, comprising:
   a frame (3),
   at least one motor (5) with a house (5A) attached to the frame (3) and a drive shaft (5B),
   a transmission (9) with an input shaft (11) that is connected to the drive shaft (5B) of the at least one motor (5) and two output shafts (13) mounted in the frame (3), which transmission (9):

comprises a differential (15), with an input (15A) connected to the drive shaft (5B) of the at least one motor and two outputs (15B) connected to the output shafts (13), and a first switchable planetary gear set (17) with three rotation bodies, wherein of the three rotation bodies of the first switchable planetary gear set (17), a rotation body (17b) is connected to the drive shaft (5B) of the at least one motor, characterized in that:

of the three rotation bodies of the first switchable planetary gear set (17), a first rotation body (17a) is connected to the input (15A) of the differential, said rotation body (17b) connected to the drive shaft (5B) of the at least one motor, forms a second rotation body, and a third rotation body (17c) can be connected to the frame (3) via a first brake (19), wherein the first and third rotation body (17a, 17c) can be connected to each other by a first clutch (21), and wherein the first brake (19) and the first clutch (21) are operated simultaneously such that when the first brake (19) is activated, the first clutch (21) is opened and vice versa, the output shafts (13) and the drive shaft of the at least one motor (5) being concentric, and the transmission (9) further comprises two second switchable planetary gear sets (23), each with three rotation bodies, of the three rotation bodies of each of the second switchable planetary gear sets (23), a first rotation body (23a) is connected to one of the outputs (15B) of the differential, the second rotation body (23b) is connected to one of the output shafts (13), and a third rotation body (23c) can be connected to the frame (3) via a second brake (25), wherein the second and third rotation body (23b, 23c) can be connected to each other by a second clutch (27), and wherein the second brake (25) and the second clutch (27) are operated simultaneously such that when the second brake (25) is energized, the second clutch (27) is opened and vice versa.

2. The compact drive (1; 101) according to claim 1, characterized in that one of the outputs (15B) of the differential passes through the at least one motor (5) which has a hollow drive shaft as the drive shaft (5B) for this purpose.

3. The compact drive (1; 101) according to claim 1, characterized in that the output shafts (13), the at least one motor (5) and the transmission (9) being concentric.

4. The compact drive (1; 101) according to claim 1, characterized in that the transmission (9) further comprises two planetary gear sets (29), each with three rotation bodies, of which a first rotation body (29a) is connected to the second rotation body (23b) of one of the second switchable planetary gear sets, a second rotation body (29b) is connected to one of the output shafts (13), and a third rotation body (29c) is attached to the frame (3).

5. The compact drive (1) according to claim 1, characterized in that the compact drive comprises a further motor (31) provided with a house (31A) attached to the frame (3) and a drive shaft (31B) which can be connected to the drive shaft (5B) of the at least one motor (5) via a third coupling (33), the motors (5, 31) being concentric.

6. The compact drive (101) according to claim 1, characterized in that the compact drive comprises a further motor (131) provided with a house (131A) attached to the frame (3) and a drive shaft (131B) which can be connected via a third coupling (133) to a third switchable planetary gear set (135) with three rotation bodies, of which a first rotation body (135a) is connected to the input (15A) of the differential, the second rotation body (135b) is connected to the drive shaft (131B) of the further motor, and a third rotation body (135c) can be connected to the frame (3) via a third brake (137), wherein the first and third rotation body (135a, 135c) can be connected via a third clutch (139), wherein the two motors (5, 131) are concentric, and wherein the third brake (137) and the third clutch (139) are operated simultaneously such that when the third brake (137) is energized, the third clutch (139) is opened and vice versa.

7. The compact drive (101) according to claim 6, characterized in that the first rotation body (17a) of the first switchable planetary gear set (17) and the first rotation body (135a) of the third switchable planetary gear set (135) are attached to each other.

8. The compact drive (1; 101) according to claim 1, characterized in that the at least one motor (5) and/or a further motor (131) is an electric motor having a rotor and a stator, wherein the drive shaft (5B; 131B) being part of the rotor and the house (5A; 131A) being part of the stator.

9. The compact drive (1; 101) according to claim 1, characterized in that the frame is designed as a housing (3) having a cylindrical shape and being closed at both ends by radially extending walls (3A) provided with central openings through which the output shafts (13) extend.

10. The vehicle (201) provided with the compact drive (1; 101) according to claim 9, characterized in that the vehicle (201) comprises two driven wheels (203) with two wheel axles (205) attached thereto that are connected with the output shafts (13), wherein the housing (3) extends longitudinally between the wheels (203).

11. The vehicle (201) according to claim 10, characterized in that the wheel axles (205) are aligned and attached to the output shafts (13).

12. The vehicle (201) according to claim 10, characterized in that the wheels (203) are provided with rims (207) and an outer diameter of the housing (3) is smaller than an outer diameter of the rims (207).

* * * * *